United States Patent
Noble et al.

[15] 3,694,029
[45] Sept. 26, 1972

[54] AIRCRAFT SEAT RESTRAINT TENSIONING MECHANISM

[72] Inventors: Herman Noble, Havertown; Edward H. Hartel, Secane, both of Pa.

[73] Assignee: The United States of America as represented by the Secretary of the Navy

[22] Filed: Sept. 22, 1971

[21] Appl. No.: 182,601

[52] U.S. Cl..................................297/389, 297/388
[51] Int. Cl..........................A62b 35/60, B60r 21/00
[58] Field of Search......297/388, 385, 389, 386, 384; 280/150 SB; 244/122 R, 122 B; 248/361

[56] References Cited

UNITED STATES PATENTS 1,657,190  1/1928  Ballou.......................297/388
3,494,665  2/1970  Klink.........................297/389
3,637,258  1/1972  Bayon........................297/388

FOREIGN PATENTS OR APPLICATIONS 808,809  12/1960  France......................297/389

Primary Examiner—James T. McCall
Attorney—R. S. Sciascia et al.

[57] ABSTRACT

Subject disclosure relates to a novel and improved system for restraining the pilot or occupant in a seat during an emergency situation. The improved system includes a lever assembly which, when operated, draws opposite ends of a lap belt downwardly and forwardly so as to minimize the tendency of the pilot to submarine under the belt.

6 Claims, 3 Drawing Figures

INVENTOR
HERMAN NOBLE
EDWARD H. HARTEL
BY
ATTORNEY

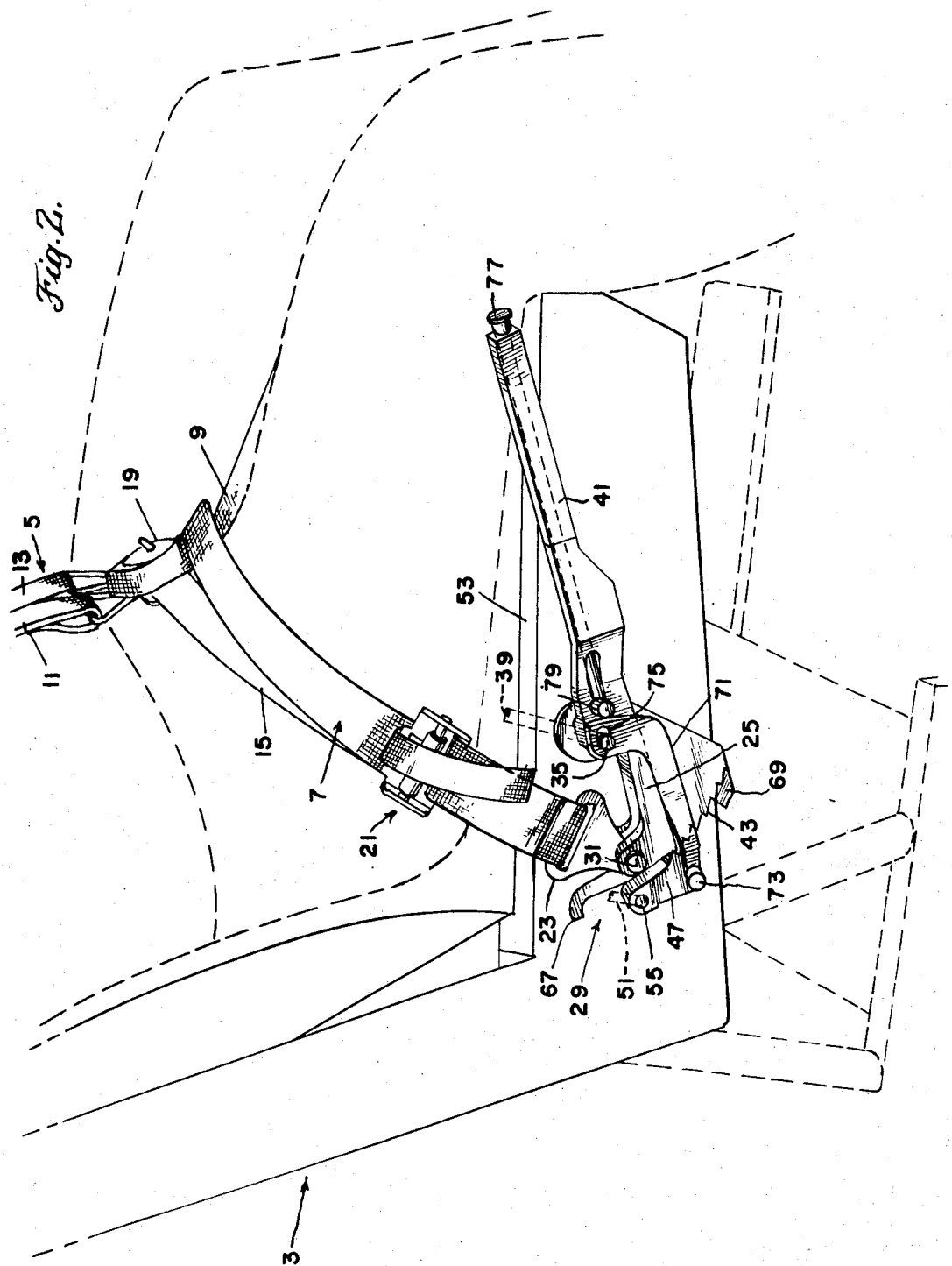

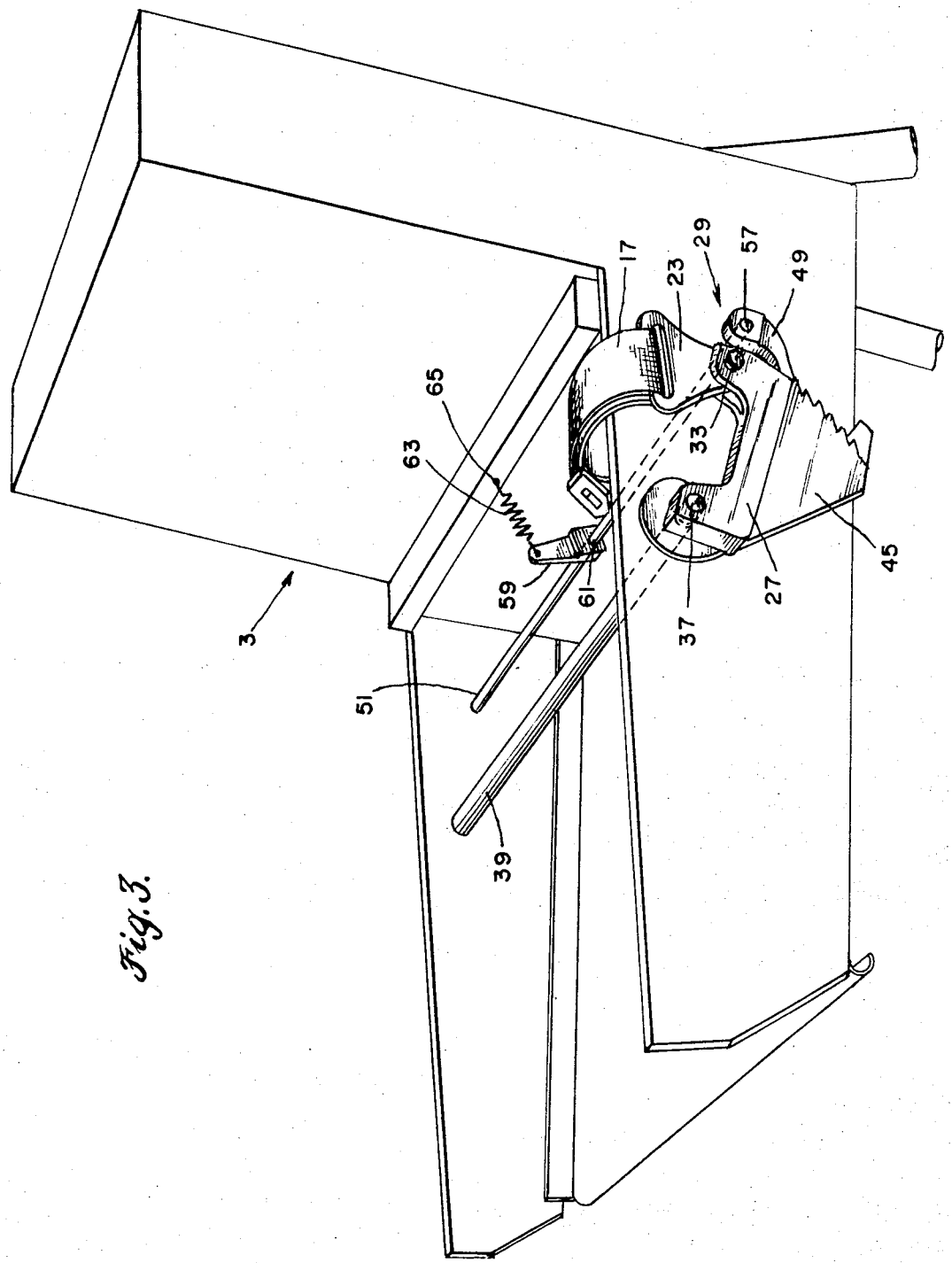

AIRCRAFT SEAT RESTRAINT TENSIONING MECHANISM

Various types of systems have been used in the past to secure a pilot or occupant of a high speed vehicle in his seat in high acceleration and deceleration situations. Systems devised heretofore, however, often require separate adjustment of the shoulder harness and lap belt straps. Moreover, the degree of restraint provided in prior systems is often not sufficient to prevent the phenomenon known as submarining during hard or crash landing situations.

It is therefore a principal object of the invention to provide a novel and improved system for restraining an occupant in his seat in an emergency situation and preventing his tendency to submarine under a restraining device.

It is a further object of the invention to provide a novel and improved seat restraint system in which a shoulder harness and a lap belt are simultaneously tensioned and relaxed by operation of a single control lever.

Other objects and many of the attendant advantages of this invention will be readily appreciated as the same becomes better understood by reference to the following detailed description when considered in connection with the accompanying drawing wherein:

FIG. 2 is a detailed view of one side of the invention shown in FIG. 1; and

FIG. 3 is a detailed view of the other side of the invention shown in FIG. 1 with the seat pan removed.

Figure 1:
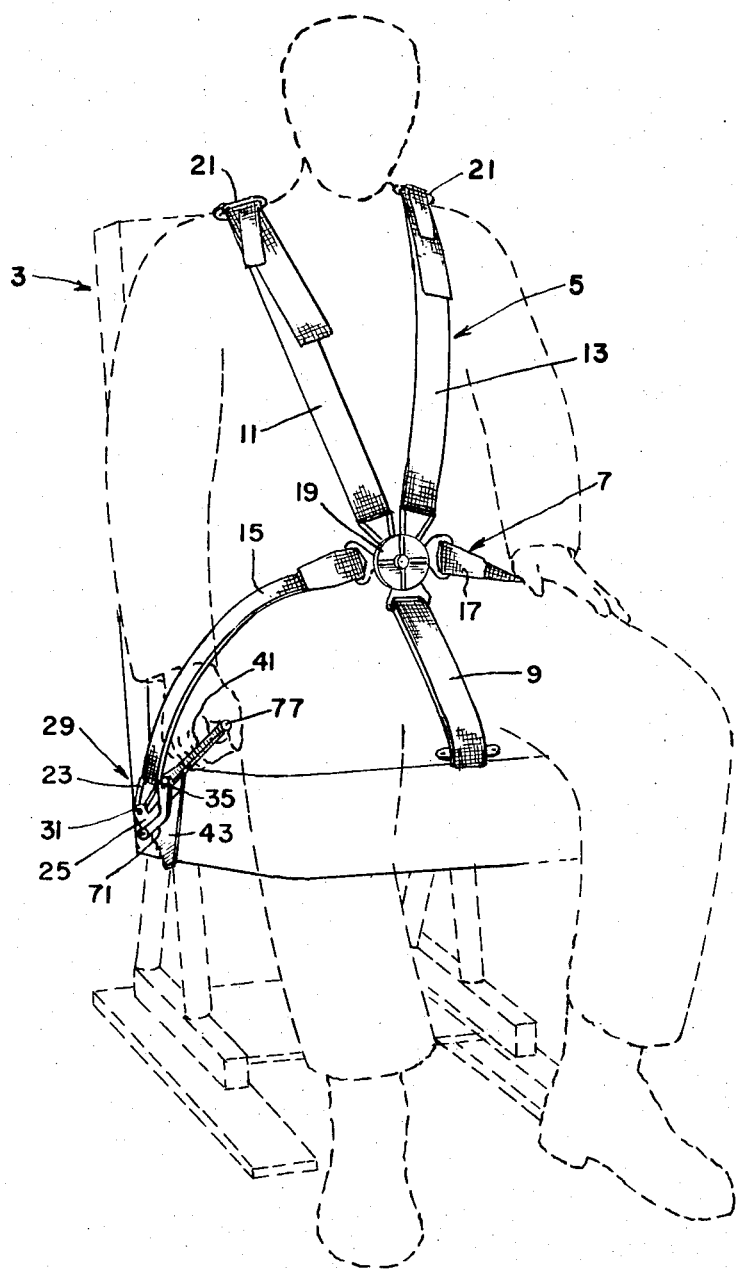
FIG. 1 is a perspective view of a preferred embodiment of the invention showing a pilot or occupant secured in his seat.

Referring now to the various figures of the drawing, it will be noted that the pilot or occupant of the seat 3 is secured therein by the shoulder harness 5, the lap belt 7 and the tie down strap 9. The shoulder harness 5 is secured at one end to the back of the seat 3 in any suitable manner and includes the straps 11 and 13 that extend downwardly over the shoulders of the pilot toward his lap. The lap belt 7 includes sections 15 and 17 which extend about the abdomen of the pilot and which are secured at one end to the improved belt tensioning apparatus of the invention that is described more fully hereinafter. The tie down strap 9 is secured at one end to the bottom of the seat 3 and extends upwardly between the legs of the pilot toward his lap. When the pilot is secured in the seat 3, the conventional quick release coupling device 19 engages the ends of the harness 5, the lap belt 7 and the tie down strap 9 that are not permanently secured to the seat 3. The buckle devices 21 in the harness 5 and the lap belt 7, provide adjustment of the effective lengths of the same.

Triangular fittings 23 at the ends of sections 15 and 17 of the lap belt 7 are respectively secured to the levers 25 and 27 of the lap belt tensioning mechanism 29 at 31 and 33. Lever 25 is pivotably mounted on one side of seat 3 at 35 and lever 27 is pivotably mounted on the other side of the seat at 37. Shaft 39 interconnects trunnions on levers 25 and 27 which are journaled in opposite sides of the seat 3 so that levers 25 and 27 and shaft 39 rotate as a unit. As will be more apparent hereinafter, the elongated extension 41 of lever 25 permits ready adjustment and control of the pivotal disposition of levers 25 and 27 and the degree of tension that is applied to sections 15 and 17 of lap belt 7.

The ratchet segments 43 and 45 of the tensioning mechanism 29 are respectively an integral part of the assemblies of levers 25 and 27. The serrated edges of segments 43 and 45 engage pawls 47 and 49. Pawls 47 and 49 are affixed to the pawl shaft 51 which extends across the width of the seat under the seat pan 53 and is rotatably journaled in opposite sides of the seat at 55 and 57. The pawl spring lever 59 is fixed to the shaft 51 at 61. The pawl spring 63 which is connected between the lever 59 at 61 and the back of the seat at 65 biases the pawl assembly such that pawls 47 and 49 normally engage the serrated edges of ratchet segments 43 and 45. Projections 67 and 69 on the upper and lower edges of ratchet segment 43 limit rotary movement of the lever assembly in its journals and as will be more apparent hereinafter, the over-all limits of adjustability of the belt assembly.

The pawl release link lever 71 is rotatably connected at one end to the pawl 47 at 73 and to the shaft 39 in slot 75 at its other end. As will be more apparent hereinafter, control of the disposition of the slotted release link lever 71 on shaft 39 at 35 controls movement of the pawls 47 and 49 into and out of contact with the serrated edges of ratchet segments 43 and 45. The pawl control rod 77 which is positioned in the extension 41 of lever 25 is adapted to engage the release link lever at 79 at one end and to protrude from the end of the lever extension 41 at its other end. A suitable spring in the extension 41 normally biases the control rod 77 toward its outermost position in the lever extension 41 so that pawls 47 and 49 normally engage ratchet segments 43 and 45.

In normal flight operations, the shoulder harness straps 11 and 13, sections 15 and 17 of the lap belt 7 and the tie down strap 9 are coupled to the quick release device 19 and the belt tensioning mechanism 29 is positioned to apply ample slack to the shoulder harness 5 and the lap belt 7 to allow freedom of movement as the pilot performs his various duties. In this position, levers 25 and 27 are rotated on the axis of their journals such that the extension 41 of lever 25 is depressed and the interconnections between the ends of levers 25 and 27 and sections 15 and 17 of the lap belt 7 are elevated as shown in the drawing. In an emergency situation when the pilot is to be securely fixed in his seat, the extension 41 of lever 25 is actuated so as to draw the ends of the lap belt 7 downwardly. Pawls 47 and 49 which are biased into engagement with the serrated edges of the ratchet segments 43 and 45 by spring 63 maintain the lever assembly in the adjusted degree of tension applied by the extension of lever 25. The lever assembly and its interconnection with the lap belt 7 is designed such that in the tensioning operation, the belt is drawn in a downwardly and forwardly direction with respect to the axis of the belt. In this way, when the restraint mechanism is actuated, the shoulder harness 5 as well as the lap belt 7 is tensioned and the tendency of the pilot to submarine under the lap belt 7 is minimized. When the emergency situation has passed and the restraint mechanism is to be relaxed, the pilot depresses the pawl control rod 77. The control rod 77 engages the release link lever 71 which operates pawls 47 and 49 out of engagement with ratchet segments 43 and 45. The extension 41 of lever 25 is then operated to its normal depressed position and tension in the lap belt 7 and shoulder harness 5 is again relaxed.

In the improved restraint system of the invention, the pilot can control the degree of applied tension by preliminary independent adjustment of the buckle devices 21 in the shoulder straps 11 and 13 and the lap belt 7 or by control of the disposition of the extension 41 of lever 25.

Obviously, many modifications and variations of the present invention are possible in the light of the above teachings. It is therefore to be understood that within the scope of the appended claims, the invention may be practiced otherwise than as specifically described.

What is claimed is:

1. In combination with a vehicle seat having bottom side and back rest portions, and a shoulder harness which is secured at one end to the back rest portion of the seat and includes straps that extend downwardly over the shoulders toward the lap of an occupant of the seat, and lap safety belt sections secured to opposite sides of the seat, extending upwardly toward the lap of the occupant, and a tie down strap secured to the bottom of the seat and extending upwardly between the legs of the occupant and a quick release device that interconnects the unsecured ends of the shoulder harness, the lap belt and the tie down strap, means for simultaneously tensioning the lap belt and shoulder harness comprising:

a. a lap belt anchoring element pivotably secured on each side of the seat, each anchoring element being secured to one end of a belt section;
   b. means interconnecting the anchoring elements so as to provide synchronous pivotal movements thereof;
   c. and means for adjustably controlling the pivoted disposition of the anchoring elements.

2. The apparatus substantially as described in claim 1 wherein the means for controlling disposition of the anchoring elements includes a ratchet and pawl mechanism.

3. The apparatus substantially as described in claim 1 wherein the pivotal movement of the anchoring elements describes an arc downwardly and forwardly from the axis of the lap belt.

4. The apparatus substantially as described in claim 1 and further including means for independently adjusting the effective length of the shoulder and lap belt straps.

5. The apparatus substantially as described in claim 2 wherein the pawl and ratchet are normally engaged.

6. The apparatus substantially as described in claim 5 and further including a release rod which controls movement of the pawl into and out of engagement with the ratchet.

* * * * *